E. PIERCE.
MOTOR VEHICLE LEVER LOCK.
APPLICATION FILED JULY 19, 1919.

1,333,093. Patented Mar. 9, 1920.

WITNESSES
Guy M. Spring
U. B. Hillyard.

Inventor
EDWARD PIERCE
By Richard B. Owen
Attorney

UNITED STATES PATENT OFFICE.

EDWARD PIERCE, OF COLUMBUS, OHIO.

MOTOR-VEHICLE-LEVER LOCK.

1,333,093.   Specification of Letters Patent.   Patented Mar. 9, 1920.

Application filed July 19, 1919. Serial No. 311,927.

*To all whom it may concern:*

Be it known that I, EDWARD PIERCE, a citizen of the United States, residing at Columbus, in the county of Franklin and State of Ohio, have invented certain new and useful Improvements in Motor-Vehicle-Lever Locks, of which the following is a specification.

The invention has for its primary object to prevent the unauthorized use of a motor vehicle, such as an automobile and aims to provide safety means, whereby a controlling lever may be locked so as to prevent its ordinary use and thereby offer a hindrance to the surreptitious appropriation of the machine.

The invention provides locking means designed chiefly for use in conjunction with the clutch lever, but which may be applied to any control lever to prevent its ready use in the accustomed way.

The drawing illustrates a preferred embodiment of the invention. However, it is to be understood that in adapting the same to meet different conditions, various changes in the form, proportion, and minor details of construction may be resorted to without departing from the nature of the invention as claimed hereinafter.

Referring to the accompanying drawing which illustrates the invention applied.

Corresponding and like parts are referred to in the following description and indicated in the several views of the drawing by like reference characters.

Figure 1:
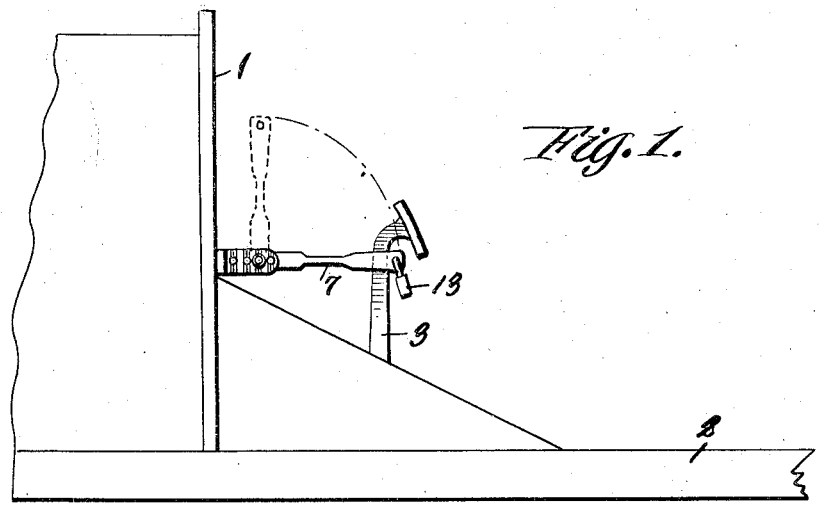
Figure 1 is a view in elevation of part of a motor vehicle showing the locking means in coöperative relation with the clutch pedal.

Referring to Fig. 1, the numeral 1 designates the dash of a motor vehicle and 2 the floor thereof. A bracket is secured to the dash 1 and an arm is pivoted thereto and adapted to engage a control lever 3 which in the present instance is shown as the clutch lever, however it is to be understood that the locking means may be applied to any control lever or part essential to the operation of the motor vehicle. While the locking means is shown applied to the dash, it is to be understood that it may be connected to any convenient part of the machine depending upon the control member or lever with which it coöperates. The bracket comprises two members 4 and 5, the member 4 being flat whereas the member 5 is corrugated or fluted. The corrugations or flutes 6 extend vertically in the relation shown and are provided as means for positively holding the locking arm 7 in vertical position, as indicated by the dotted lines in Fig. 1 so as to be out of the way and prevent its accidental falling into a position so as to interfere with the free operation of the lever 3 or like part. The members 4 and 5 are adapted to spring apart and are connected at one end. A suitable fastening 8 serves as means for connecting the bracket to the dash 1 or like part. In the preferable construction, the part 8 is formed with the bracket and constitutes a shank which is threaded to receive a nut 9. The members comprising a bracket are formed with a number of openings 10 through any one of which a fastening 11 is adapted to be passed.

Figure 2:
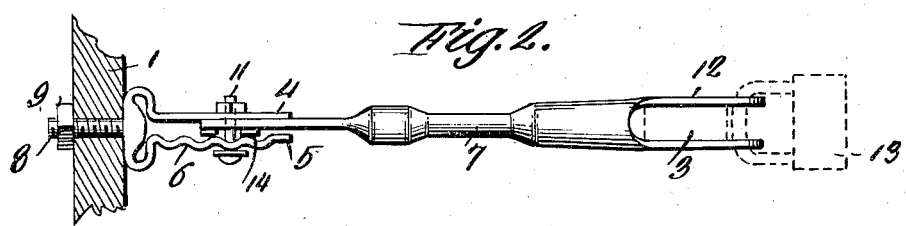
Fig. 2 is a top view showing the parts on a larger scale, a portion of the machine being shown in section as also the clutch pedal lever.
Figure 3:
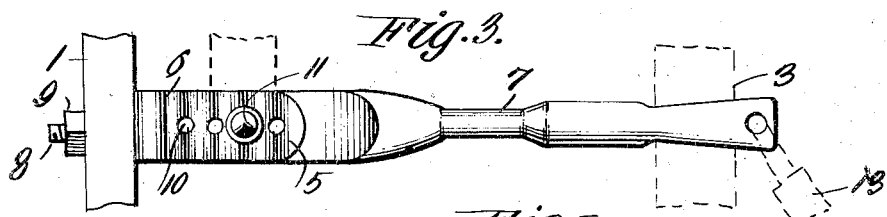
Fig. 3 is a side view of the parts illustrated in Fig. 2 on the same scale.
Figure 4:
Fig. 4 is a detail view of a portion of the bracket and the arm pivoted thereto.
Figure 5:
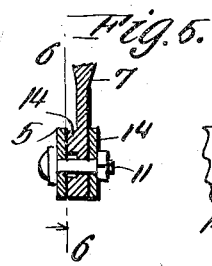
Fig. 5 is a sectional detail on the line 5—5 of Fig. 4 looking in the direction of the arrow.
Figure 6:
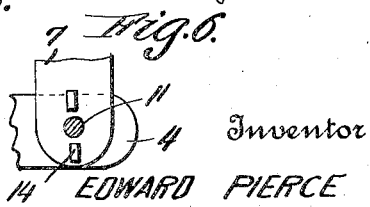
Fig. 6 is a detail section on the line 6—6 of Fig. 5.

The locking arm 7 is pivotally mounted upon the fastening 11 between the members 4 and 5 of the bracket and its outer end is bifurcated, as indicated at 12 so as to embrace opposite sides of the lever 3. The outer ends of the bifurcations are apertured to receive the bow of a pad-lock 13, whereby the control lever 3 is made secure when the lock arm 7 is engaged therewith. A lateral projection 14 is provided on one side of the arm 7 at its pivoted end and is adapted to coöperate with the flutes or corrugations 6 of the bracket so as to hold the arm in upright position, as indicated by the dotted lines in Fig. 1 and thereby prevent its accidental falling when thrown upward out of the way. The lateral projection 14 consists of a rib which extends upon opposite sides of the pivot fastening 11, so as to engage the flutes or corrugations at points above and below the pivot fastening 11, as indicated most clearly in Fig. 5. When the locking arm is turned into horizontal position, the lateral projection 14 occupies a position at a right angle to the flutes or corrugations 6, as shown most clearly in Fig. 2. When the arm 7 is thrown upward out of the way, the lateral projection 14 is engaged with one of the flutes or corrugations, whereby said arm is held elevated and prevented from accidental falling so as to be in the way and interfere with the free operation of the control lever 3.

The foregoing description and the drawing have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. Safety means of the character specified, comprising a bracket embodying spring members, one of said members being flat and the other member provided with flutes or corrugations and a locking arm pivoted between the members and having a lateral projection to coöperate with the flutes or corrugations to positively hold the locking member in inoperative position.

2. Locking means of the character specified, comprising a bracket having a threaded shank and comprising spring members, one of which is formed with corrugations and a locking arm pivoted between the spring members and having a lateral projection to coöperate with the corrugations to positively hold the locking arm in inoperative position.

In testimony whereof I affix my signature in presence of two witnesses.

EDWARD PIERCE.

Witnesses:
SHERMAN J. BENNETT,
CHAS. R. BENNETT.